United States Patent [19]

Yu

[11] Patent Number: 5,320,244

[45] Date of Patent: Jun. 14, 1994

[54] STORAGE BOX FOR STORING OF SUBSTANTIALLY FLAT ARTICLES

[76] Inventor: Jackson Yu, 2F, No. 2, Chung-Hua St., Peitou Dist., Taipei City, Taiwan

[21] Appl. No.: 134,930

[22] Filed: Oct. 12, 1993

[51] Int. Cl.$^5$ .......................................... B65D 85/57
[52] U.S. Cl. .................................. 220/507; 220/523; 220/533; 220/351; 206/387; 206/309; 312/9.21
[58] Field of Search ................ 220/507, 533, 350; 206/328, 387, 444, 445, 425, 449, 309; 211/40, 41; 312/9.1, 9.9, 9.21

[56] References Cited

U.S. PATENT DOCUMENTS

| | | | |
|---|---|---|---|
| 2,555,705 | 6/1951 | Schafer | 220/350 |
| 3,150,791 | 9/1964 | Shile | 220/350 |
| 4,162,024 | 7/1979 | Shanley | 220/350 |
| 4,465,187 | 8/1984 | Kinard et al. | 220/350 |
| 4,580,679 | 4/1986 | Hellman, III | 220/350 |
| 4,815,795 | 3/1989 | Accumanno | 206/387 |
| 4,819,802 | 4/1989 | Gutierrez | 206/387 |
| 4,846,355 | 7/1989 | Price, Sr. et al. | 206/387 |
| 5,183,177 | 2/1993 | Yu | 206/387 X |
| 5,277,309 | 1/1994 | Shteynberg | 206/444 X |

FOREIGN PATENT DOCUMENTS 2021072 11/1979 United Kingdom ................ 206/387

Primary Examiner—Steven M. Pollard
Attorney, Agent, or Firm—Marshall & Melhorn

[57] ABSTRACT

A storage box includes a housing, which has a top wall, a bottom wall, a right side wall, a left side wall and a rear wall, and a storage assembly which is disposed removably in the housing for confining articles therein. The storage assembly includes a pair of left and right plates positioned against the left and right side walls. Each of the left and right plates has a top side, a bottom side, a front side, a rear side, a guiding rail extending along the front side, the top side and the rear side, and inwardly projecting racks spaced vertically from one another. Each rack of the left plate is aligned horizontally with a corresponding one of the racks of the right plate. A top plate is disposed between the left and right plates and has two opposite end portions secured detachably to the left and right plates. A flexible sliding door is placed between the left and right plates and has two opposite ends that engage slidably the guiding rails. The storage box further includes a retaining frame attached removably to the housing for retaining the storage assembly in the housing.

11 Claims, 5 Drawing Sheets ns

STORAGE BOX FOR STORING OF SUBSTANTIALLY FLAT ARTICLES

BACKGROUND OF THE INVENTION

1. Field of the Invention

The present invention relates to a storage box, particularly to an improved storage box which is used to store flat articles, such as audio cassettes and compact discs (CD), therein and which is relatively easy to manufacture.

2. Description of the Related Art

FIGS. 1 and 2 show a conventional storage box (A) for storing of flat articles. The conventional storage box (A) was disclosed in U.S. Pat. No. 5,183,177 and includes a housing 11, a pair of left and right separate plates 12, two rear spring boards 13, a top plate 14, and a flexible sliding door 15. The housing 11 has a top wall, a bottom wall, a right side wall, a left side wall and a rear wall which are connected to one another to form a front opening. The housing 11 further has two opposite front flanges (ff) projecting from the left and right side walls at the front opening. The bottom wall has an elongated positioning groove 11' which is substantially parallel to the left and right side walls and a rear elongated access slot 11" which is located adjacent to and substantially parallel to the rear wall. Each of the left and right plates 12 has a guiding rail 12' which extends along a rear side, a top side and a front side thereof, a plurality of inwardly projecting racks 12" which are spaced vertically, and a horizontal groove (g) which is located above the racks 12". Each of the left and right plates 12 further has a rear plate-like flange 121 which projects perpendicularly therefrom between the racks 12" and the guiding rail 12". The top plate 14 is provided with a vertical partition plate 14', which extends downwardly therefrom and which is parallel to the left and right plates 12, and a back panel 14" which projects laterally from a rear side of the vertical partition plate 14' and which is perpendicular to the top plate 14.

In assembly, the left and right plates 12 are respectively pressed against the left and right side walls of the housing 11 and are firmly fitted between the rear wall and the front flanges (ff) of the housing 11. The top plate 14 and the vertical partition plate 14' are inserted into the housing 11 by sliding the same along the horizontal grooves (g) of the left and right plates 12 and the elongated positioning groove 11' of the bottom wall of the housing 11. Afterwards, the spring boards 13 are screwed to the rear plate-like flanges 121 of the left and right plates 12 and the back panel 14" which is connected to the vertical partition plate 14'. The flexible sliding door 15 is pushed into the housing 11 through the rear elongated access slot 11" of the bottom wall of the housing 11. The sliding door 15 has two opposite ends which engage slidably and respectively the guiding rails 12' of the left and right plates 12. In this way, the conventional storage box (A) is assembled. Such a conventional storage box (A) can provide a strong and durable construction and can minimize the problem of dusting the sliding door. However, since the housing 11 confines a relatively small space, proper placement of the components of the storage box (A) in the housing 11 cannot be accomplished conveniently.

SUMMARY OF THE INVENTION

Therefore, the objective of this invention is to provide an improved storage box which is used to store substantially flat articles, such as audio cassettes or CDs, therein and which can be assembled easily and conveniently without the limitation of the space confined by a housing thereof.

Accordingly, a storage box of this invention is used for storing substantially flat articles therein and includes a housing which has a top wall, a bottom wall, a right side wall, a left side wall and a rear wall that are connected to one another to form a front opening thereamong.

The storage box includes a storage assembly which is disposed removably in the housing for confining the substantially flat articles. The storage assembly includes a pair of separate left and right plates which are positioned respectively against the left and right side walls of the housing. Each of the left and right plates has a top side, a bottom side, a front side, a rear side, a guiding rail that extends along the front side, the top side and the rear side, and a plurality of inwardly projecting racks that are spaced vertically from one another. Each of the inwardly projecting racks of the left plate is aligned horizontally with a corresponding one of the inwardly projecting racks of the right plate. A top plate is disposed between the left and right plates and is located adjacent to the top wall of the housing when the storage assembly is disposed in the housing. The top plate has two opposite end portions secured detachably and respectively to the left and right plates. A flexible sliding door is placed between the left and right plates and has two opposite ends that engage slidably the guiding rail of a respective one of the left and right plates.

The storage box further includes a retaining frame which is attached removably to the housing at the front opening for retaining the storage assembly in the housing.

In assembly, the storage assembly can be assembled first outside the housing by fitting the left and right plates, the top plate and the flexible sliding door together. The assembled storage assembly is then placed into the housing. Afterwards, the retaining frame is attached to the housing to prevent untimely removal of the storage assembly from the housing. Therefore, the storage box according to the present invention can be assembled easily and conveniently without the limitation of the space confined by the housing.

BRIEF DESCRIPTION OF THE DRAWINGS

Other features and advantages of the present invention will become apparent in the following detailed description of the preferred embodiment, with reference to the accompanying drawings, in which:

FIG. 1 is a perspective view of a conventional storage box.

FIG. 2 is an exploded view of the conventional storage box.

FIG. 3 is a perspective view of a storage box of this invention.

FIG. 4 is a partially exploded view of the storage box shown in FIG. 3.

FIG. 5 is an exploded view of a storage assembly of the storage box shown in FIG. 4.

FIG. 6 is a partially sectional view showing a fastening unit of the storage assembly.

DETAILED DESCRIPTION OF THE PREFERRED EMBODIMENT

Figure 1:
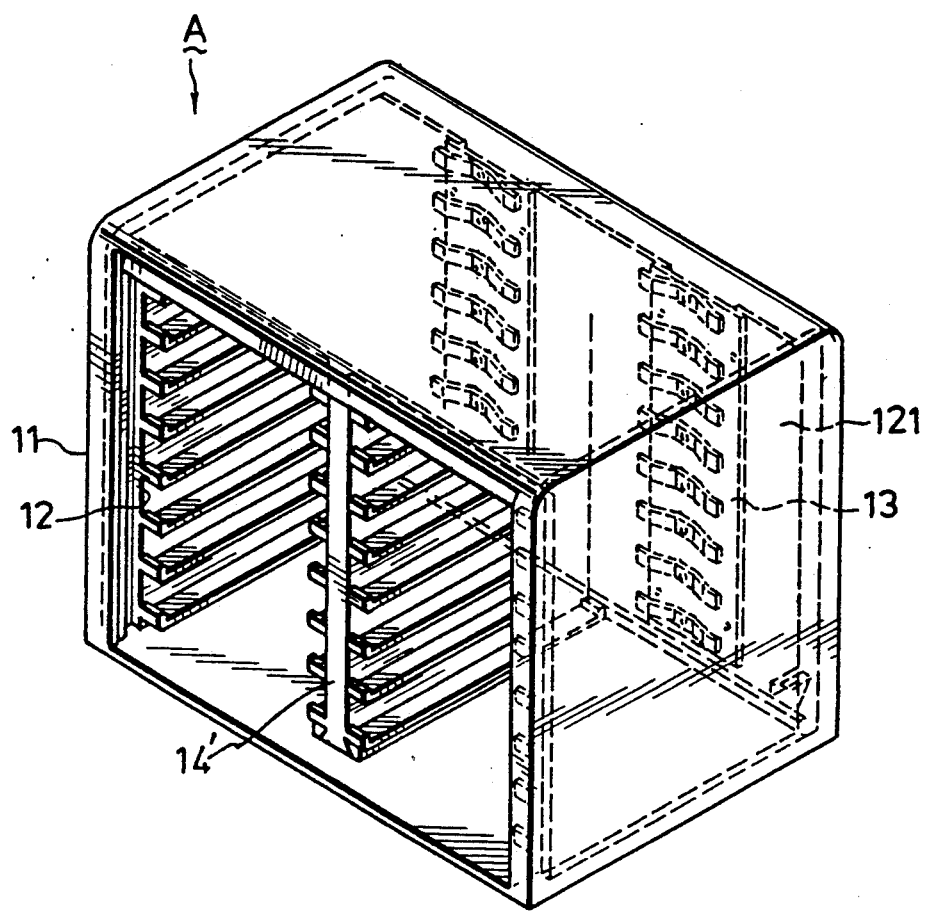
Figure 2:
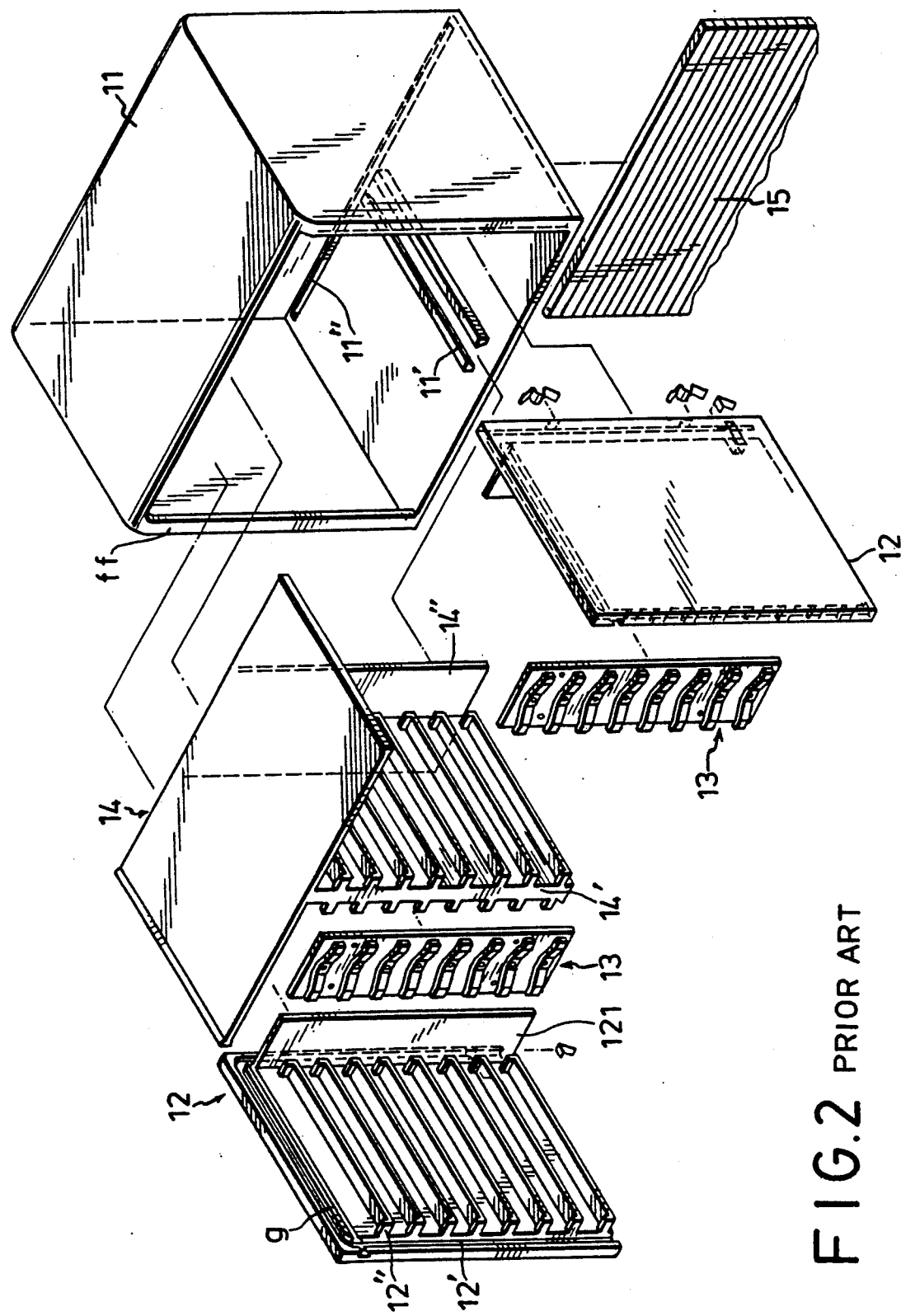
Figure 3:
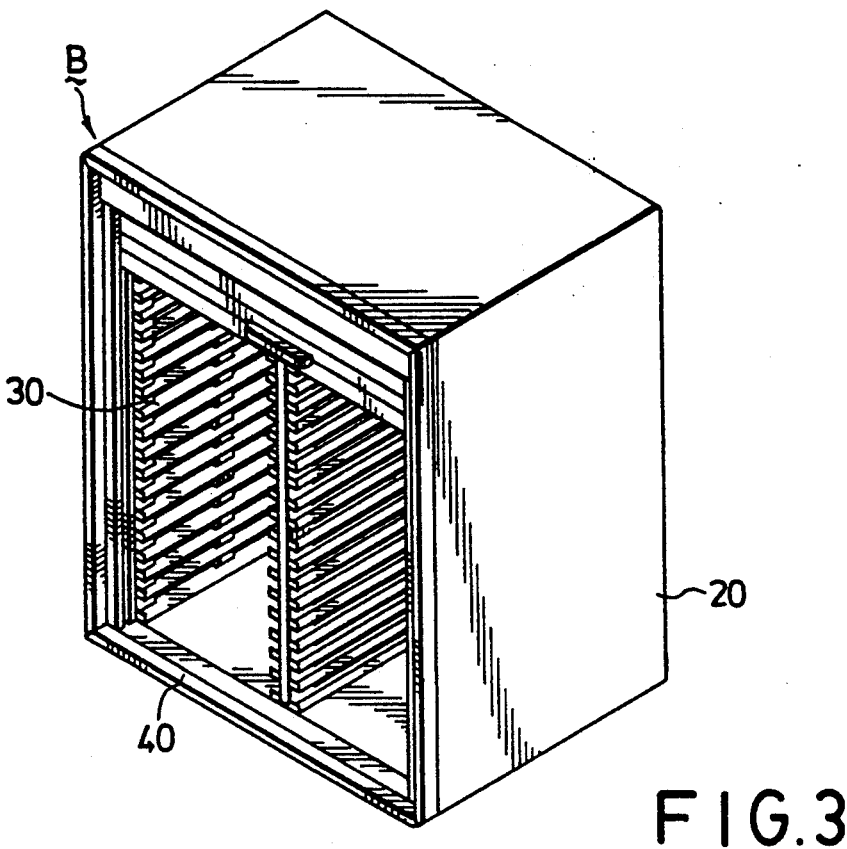
Figure 4:
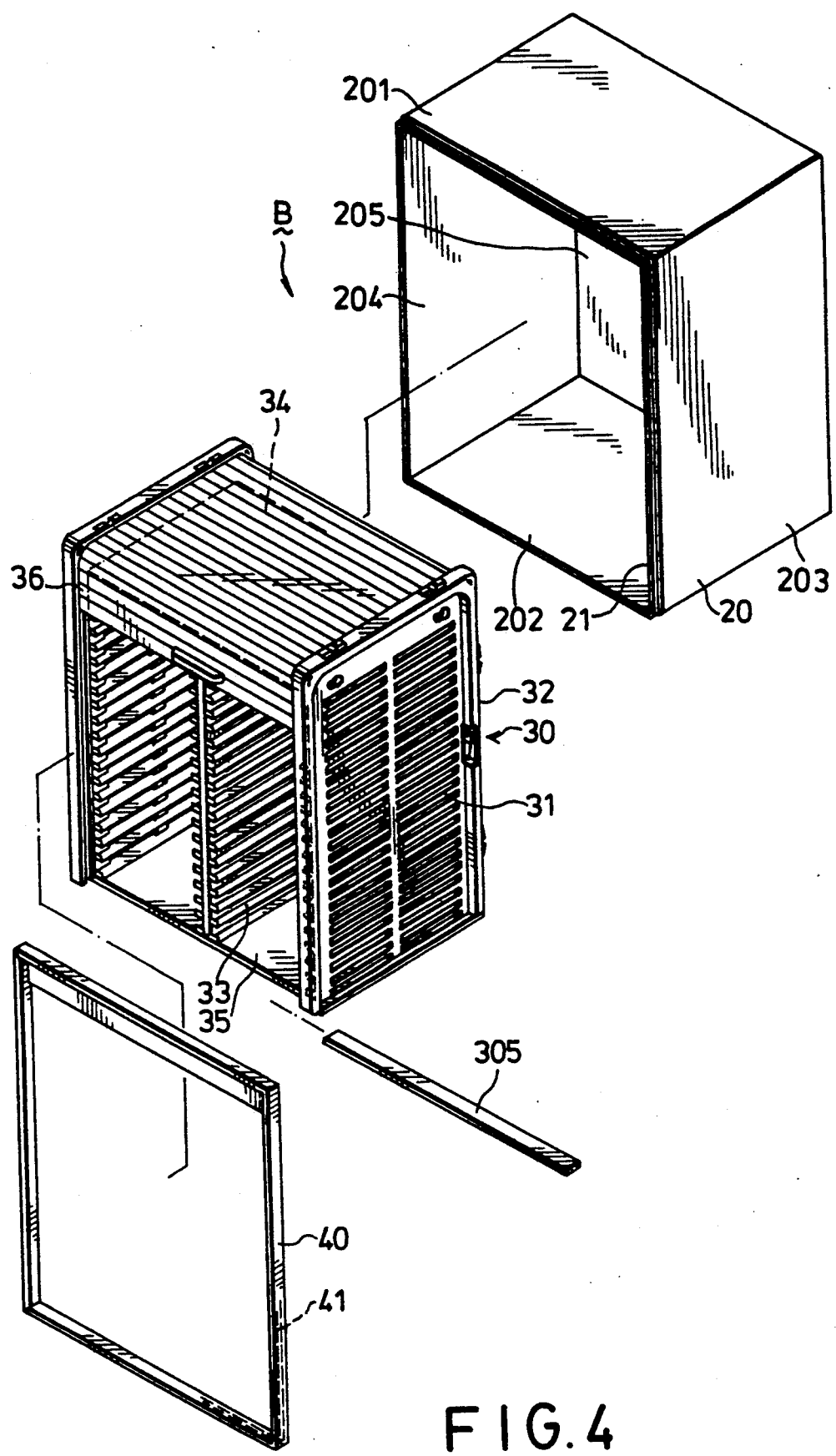
Figure 5:
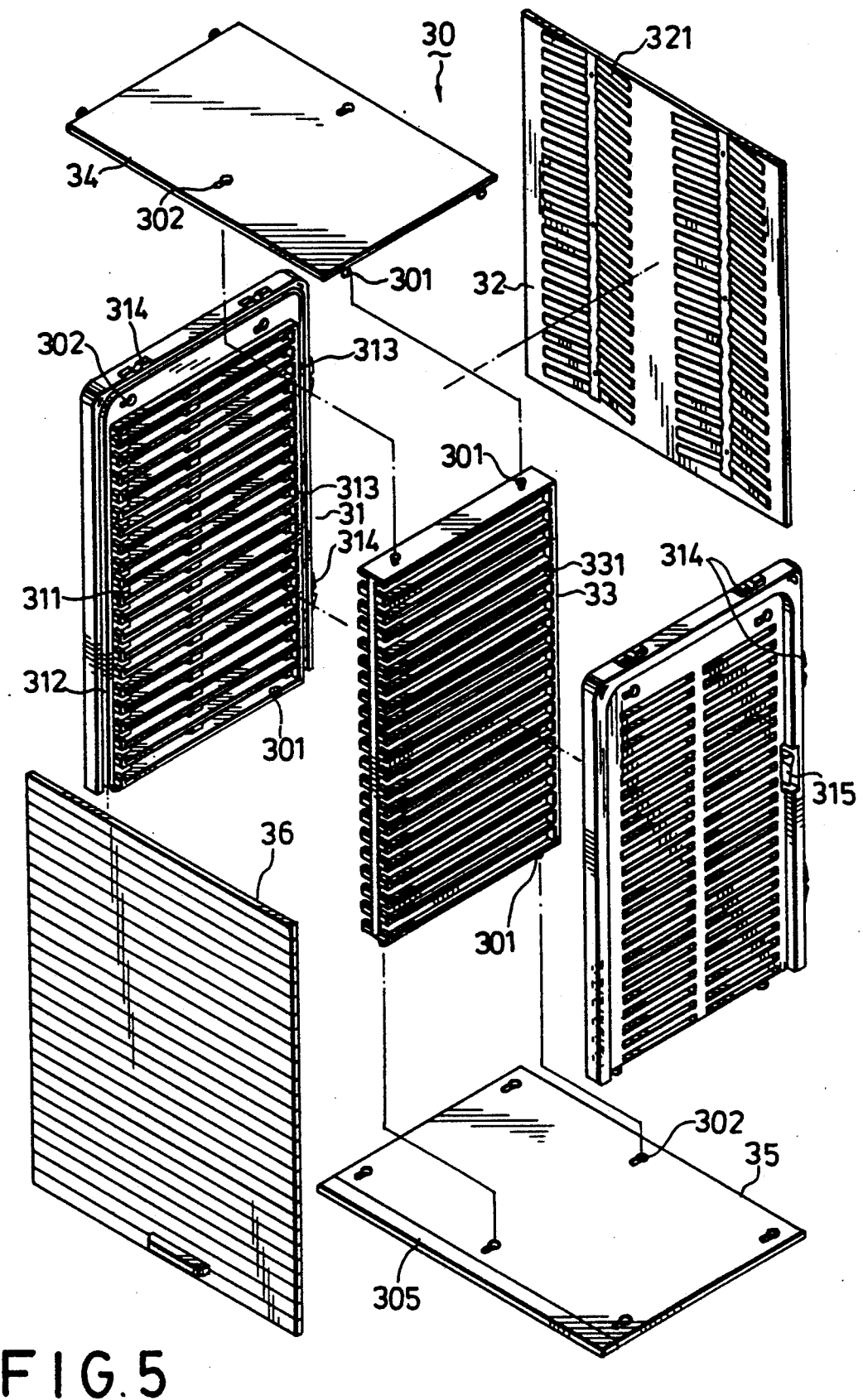

FIGS. 3 to 5 show a preferred embodiment of a storage box (B) of this invention. The storage box (B) is used for storing substantially flat articles, such as audio cassettes and CDs, therein and includes a housing 20 which has a top wall 201, a bottom wall 202, a right side wall 203, a left side wall 204 and a rear wall 205 which are connected to one another to form a front opening thereamong. The housing 20 further has a front flange 21 that projects forwardly from a front end of each of the top wall 201, the bottom wall 202, the right side wall 203 and the left side wall 204.

The storage box (B) includes a storage assembly 30 which is disposed removably in the housing 20 for confining the articles. Referring to FIG. 5, the storage assembly 30 includes a pair of separate left and right plates 31 which are positioned respectively against the left and right side walls 204, 203 of the housing 20 when the storage assembly 30 is disposed in the housing 20. Each of the left and right plates 31 has a top side, a bottom side, a front side, a rear side, a guiding rail 312 that extends along the front side, the top side and the rear side, and a plurality of inwardly projecting racks 311 that are spaced vertically from one another. Each rack 311 of the left plate 31 is aligned horizontally with a corresponding one of the racks 311 of the right plate 31.

A top plate 34 is disposed between the left and right plates 31 and is located adjacent to the top wall 201 of the housing 20 when the storage assembly 30 is disposed in the housing 20. The top plate 34 has two opposite end portions and an intermediate portion located between the opposite end portions. The opposite end portions of the top plate 34 are secured detachably and respectively to the left and right plates 31. A bottom plate 35 is disposed between the left and right plates 31 and is located adjacent to the bottom wall 202 of the housing 20 when the storage assembly 30 is disposed in the housing 20. The bottom plate 35 has two opposite end portions which are secured detachably and respectively to the left and right plates 31 and an intermediate portion which is located between the opposite end portions.

A vertical partition plate 33 is disposed between and is substantially parallel to the left and right plates 31. The vertical partition plate 33 has a top end which is secured detachably to the intermediate portion of the top plate 34, a bottom end which is secured detachably to the intermediate portion of the bottom plate 35 and two opposite faces which face respectively the left and right plates 31. Each of the opposite faces has a plurality of vertically spaced racks 331 which are aligned horizontally with the racks 311 of a respective one of the left and right plates 31.

Figure 6:
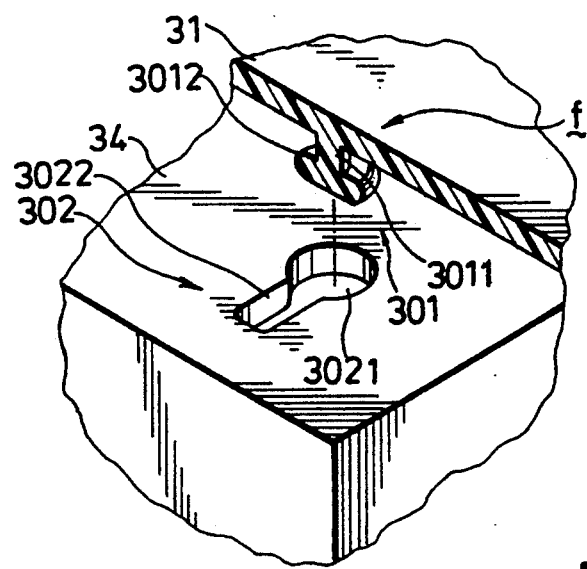

It is noted that the storage assembly 30 is provided with a plurality of fastening units (f) for fastening detachably and respectively the top and bottom plates 34, 35 to the vertical partition plate 33 and the left and right plates 31. Referring to FIG. 6, each fastening unit (f) includes an engaging slot 302 and a dovetail 301 to engage the engaging slot 302. The dovetail 30 has a neck 3011 and an enlarged head 3012. The engaging slot 302 has an enlarged portion 3021 to permit entry of the enlarged head 3012 thereinto and a constricted elongated portion 3022 with a width that is substantially equal to that of the neck 3011. The neck 3011 can be engaged with the constricted elongated portion 3012 after the enlarged head 3012 enters the enlarged portion 3021. Referring again to FIG. 5, the top plate 34 has two engaging slots 302 formed in the intermediate portion thereof and two dovetails 301 projecting outwardly from each of the opposite end portions. The bottom plate 35 has two engaging slots 302 formed in each of the intermediate portion and the opposite end portions thereof. Each of the left and right plates 31 has two engaging slots 302 formed in the top side thereof and two dovetails 301 projecting from the bottom side thereof. The vertical partition plate 33 has two dovetails 301 projecting from each of the top and bottom ends thereof. In this way, by engagement between the engaging slots 302 and the dovetails 301, the top and bottom plates 34, 35 can be secured detachably and respectively to the left and right plates 31 and the vertical partition plates 33. In addition, the bottom plate 35 is further provided with an elongated plate member 305.

A rear spring board 32 is located between the left and right plates 31, behind the vertical partition plate 33 and in front of the rear wall 205 of the housing 20 when the storage assembly 30 is disposed in the housing 20. The spring board 32 has two opposite ends which are attached respectively to the left and right plates 31 by means of engaging members 313. The spring board 32 is provided with two rows of vertically spaced spring members 321 which are substantially aligned horizontally with the racks 311, 331.

A flexible sliding door 36 is placed between the left and right plates 31. The sliding door 36 includes a plurality of elongated parallel plate members, which are connected successively and flexibly to one another, and has two opposite ends which engage slidably the guiding rail 312 of a respective one of the left and right plates 31. Each of the left and right plates 31 has a stop member 315 provided at the rear side thereof in the guiding rail 312 in order to limit movement of the sliding door 36 so that the sliding door 36 can be easily drawn forward and closed.

Referring to FIGS. 3 and 4, the storage box (B) further includes a retaining frame 40 which is attached removably to the housing 20 at the front opening for retaining the storage assembly 30 in the housing 20. The retaining frame 40 is formed with a retaining groove 41 to engage the front flange 21 of the housing 20 when the retaining frame 40 is attached to the housing 20.

Referring again to FIG. 4, in assembly, the storage assembly 30 can be assembled first outside the housing 20 by fitting the left and right plates 31, the rear spring board 32, the vertical partition plate 33, the top plate 34, the bottom plate 35 and the sliding door 36 together. The elongated plate member 305 is attached to the bottom plate 35 such that the bottom plate 35 is aligned with the front ends of the left and right plates 31. The assembled storage assembly 30 is then put into the housing 20. Afterwards, the retaining frame 40 is attached to the housing 20 in order to prevent the untimely removal of the storage assembly 30 from the housing 20. In this way, the storage box (B) can be assembled easily and conveniently without the limitation of the space confined by the housing 20. Since positioning spring members 314 which are provided on the top and rear peripheries of the left and right plates 31 bear against the top and rear walls 201, 205 of the housing 20 and urge the left and right plates 31 against the retaining frame 40, the left and right plates 31 are fitted firmly in the housing 20, thereby fitting firmly the storage assembly 30 in the housing 20.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A storage box for storing of substantially flat articles therein comprising:

a housing having a top wall, a bottom wall, a right side wall, a left side wall and a rear wall which are connected to one another to form a front opening thereamong;

a storage assembly disposed removably in said housing for assortment of said article, said storage assembly including: a pair of separate left and right plates which are positioned respectively against said left and right side walls of said housing, each of said left and right plates having a top side, a bottom side, a front side, a rear side, a guiding rail that extends along said front side, said top side and said rear side, and a plurality of inwardly projecting racks that are spaced vertically from one another, each of said inwardly projecting racks of said left plate being aligned horizontally with a corresponding one of said racks of said right plate; a top plate which is disposed between said left and right plates and which is located adjacent to said top wall of said housing when said storage assembly is disposed in said housing, said top plate having two opposite end portions and an intermediate portion located between said end portions, said end portions being secured detachably and respectively to said left and right plates; and a flexible sliding door which is placed between said left and right plates and which has two opposite ends that engage slidably said guiding rail of a respective one of said left and right plates; and a retaining frame attached removably to said housing at said front opening for retaining said storage assembly in said housing.

2. A storage box as claimed in claim 1, wherein said housing further has a front flange that projects forwardly from said top wall, said bottom wall, said right side wall and said left side wall at said front opening, said retaining frame being formed with a retaining groove to engage said front flange when said retaining frame is attached to said housing.

3. A storage box as claimed in claim 1, wherein said storage assembly further includes a bottom plate which is disposed between said left and right plates and which is located adjacent to said bottom wall of said housing when said storage assembly is disposed in said housing, said bottom plate having two opposite end portions secured detachably and respectively to said left and right plates and an intermediate portion located between said end portions.

4. A storage box as claimed in claim 3, wherein said storage assembly further includes a vertical partition plate which is disposed between and substantially parallel to said left and right plates, said vertical partition plate having a top end secured detachably to said intermediate portion of said top plate, a bottom end secured detachably to said intermediate portion of said bottom plate and two opposite faces opposing respectively said left and right plates, each of said opposite faces having a plurality of vertically spaced racks which are aligned horizontally with said racks of a respective one of said left and right plates.

5. A storage box as claimed in claim 4, wherein said storage assembly further includes a rear spring board which is located between said left and right plates, behind said vertical partition plate and in front of said rear wall of said housing when said storage assembly is disposed in said housing, said rear spring board having two opposite ends secured detachably and respectively to said left and right plates, said rear spring board being provided with two rows of vertically spaced spring members which are substantially aligned horizontally with said racks.

6. A storage box as claimed in claim 4, wherein said storage assembly is provided with a plurality of fastening units for fastening respectively said top plate and said bottom plate to said vertical partition plate and said left and right plates.

7. A storage box as claimed in claim 6, wherein each of said fastening units of said storage assembly includes an engaging slot which is formed on each of said intermediate portion of said top plate, said opposite end portions and said intermediate portion of said bottom plate and said top side of each of said left and right plates, and a dovetail which projects respectively from each of said opposite end portions of said top plate, said top end and said bottom end of said vertical partition plate and said bottom side of each of said left and right plates to engage said engaging slot.

8. A storage box as claimed in claim 7, wherein said dovetail has a neck and an enlarged head, said engaging slot having an enlarged portion to permit entry of said enlarged head thereinto and a constricted elongated portion having a width substantially equal to that of said neck.

9. A storage box as claimed in claim 1, wherein said flexible sliding door includes a plurality of elongated parallel plate members which are connected successively and flexibly to one another.

10. A storage box as claimed in claim 1, wherein each of said left and right plates has a rear periphery with a positioning spring member provided thereat to bear against said rear wall of said housing and to urge a respective one of said left and right plates against said retaining frame when said storage assembly is disposed in said housing.

11. A storage box as claimed in claim 1, wherein each of said left and right plates has a stop member provided at said rear side thereof in said guiding rail to limit movement of said sliding door.

* * * * *